United States Patent [19]

Leach

[11] Patent Number: 4,550,986
[45] Date of Patent: Nov. 5, 1985

[54] LAYERED MIRRORS INCLUDING A COMPRESSIBLE LAYER AND A POLYURETHANE SKIN

[76] Inventor: Roger J. Leach, 12 Tufton Gardens, Hurst Park, East Molesey, Surrey, England

[21] Appl. No.: 513,076

[22] Filed: Jul. 12, 1983

[30] Foreign Application Priority Data

Jul. 14, 1982 [GB] United Kingdom ................ 8220430
Dec. 8, 1982 [EP] European Pat. Off. ........ 82306542.0

[51] Int. Cl.$^4$ ............................ G02B 5/08; B32B 9/00
[52] U.S. Cl. ...................................... 350/641; 156/71; 156/308.2; 428/912.2; 428/318.8
[58] Field of Search ............... 350/288, 310, 293, 299, 350/303, 307, 641; 428/912.2, 318.8; 156/71, 308.2

[56] References Cited

U.S. PATENT DOCUMENTS

| 3,104,274 | 9/1963 | King ................................... 350/293 |
| 3,410,636 | 11/1968 | Herrick ............................... 350/288 |
| 3,450,465 | 6/1969 | Prance et al. ....................... 350/288 |
| 3,733,116 | 5/1973 | Hutchinson ......................... 350/288 |
| 3,776,618 | 12/1973 | Perison .............................. 350/307 |
| 3,985,429 | 10/1976 | Fleischer ............................ 350/288 |
| 4,223,983 | 9/1980 | Bloom ................................ 350/303 |
| 4,331,382 | 5/1982 | Graff .................................. 350/303 |
| 4,343,533 | 8/1982 | Currin et al. ....................... 350/288 |
| 4,465,734 | 8/1984 | Laroche et al. .................... 428/912.2 |
| 4,469,089 | 9/1984 | Sorko-Ram ......................... 350/288 |

FOREIGN PATENT DOCUMENTS

| 636757 | 12/1963 | Belgium ............................. 350/293 |
| 637411 | 1/1964 | Belgium ............................. 350/288 |
| 2150217 | 4/1973 | Fed. Rep. of Germany ...... 350/288 |
| 2095400 | 2/1972 | France ............................... 350/288 |

*Primary Examiner*—Jon W. Henry
*Attorney, Agent, or Firm*—Browdy and Neimark

[57] ABSTRACT

In a shockproof mirror of the kind comprising a glass or plastics sheet or film backed with a reflecting layer which is bonded to a flexible and resiliently compressible foam pad by means of which the whole is intended to be glued to a substantially rigid support structure, e.g. wall or ceiling, by means of an adhesive composition containing a volatile liquid component, degradative attack of the foam and/or of the adhesive bond between the foam and the reflecting layer by said volatile adhesive component is reduced or prevented by heat bonding a substantially impermeable polyurethane skin to the exposed face of the foam.

7 Claims, 2 Drawing Figures

LAYERED MIRRORS INCLUDING A COMPRESSIBLE LAYER AND A POLYURETHANE SKIN

BACKGROUND OF THE INVENTION

This invention relates to improvements in or relating to mirrors which are intended to be bonded to a substantially rigid support surface, for example a wall, a door or a substantially rigid backing board.

There is considerable interest in the artistic and architectural possibilities of structures obtained by laminating mirrors to support surfaces, especially the internal and external walls of buildings. However, there is a tendency for the products so obtained to fracture when exposed to an environment in which substantial variations in temperature are encountered; for example such as when the product comprises outside cladding for a building or is otherwise exposed to the elements and/or to direct sunlight. The problem is particularly acute when employing large mirrors, especially where the transparent face is provided by a sheet of glass. To overcome this defect it has been proposed to include a flexible and resiliently compressible layer of a polymeric foam which is bonded to the layer of reflecting material and in use lies between the mirror and the surface to which it is laminated; see GB-A-2048166.

This foam interlayer absorbs the stresses developed during heating or cooling of the mirror and the surface to which it is attached due to the different coefficients of expansion of the mirror and the surface, thereby reducing or preventing fracture of the mirror. The foam layer also provides the mirror with valuable shock absorbant characteristics which reduce its tendency to fracture on impact. Further, and very importantly, where the transparent face is glass and fracture occurs, it has been found that the glass fragments tend to remain bonded to the foam layer, thereby reducing the danger of damage to property or persons by flying or falling glass, and substantially improving the safety aspects of the product.

Mirrors backed with such foam layers have therefore found rapid acceptance in the market and are especially valuable in applications where safety is paramount.

We have found however the components of the adhesives used to bond such foam layer-backed mirrors to the support surfaces tend to infiltrate the foam to the detriment of the foam itself, the reflecting coating of the mirror and/or the adhesive employed to bond the mirror to the foam. For example, where commonly used contact adhesives are used to bond the foam-backed mirror to the support surface, solvents in the adhesive (or vapours thereof) tend to pass through the foam and attack the bond between it and the mirror, thereby causing the foam to delaminate from the mirror.

There is therefore a need to develop some means for preventing these components of the adhesive from contacting the foam or its bond with the reflecting layer of the mirror. However, any barrier layer must itself be unaffected by these components and must bond well to the adhesive and to the foam layer. Further, it must of course be capable of being bonded to the foam layer by means other than an adhesive having components which are capable of attacking the foam layer and/or its bond with the reflective layer of the mirror.

We have now found that these requirements are satisfied by heat bonding a flexible and substantially impermeable polyurethane skin to the exposed face of the foam layer.

SUMMARY OF THE PRESENT INVENTION

Thus, according to the present invention, there is provided a mirror structure of the kind comprising a transparent facing lamina backed by a layer of reflecting material, said layer-backed lamina being bonded to a flexible and resiliently compressible layer of polymeric, e.g. plastics or rubber, foam and wherein the exposed face of the foam layer, i.e. the face on the opposite side to that to which the lamina is bonded, has heat bonded thereto a flexible and substantially impermeable polyurethane skin.

The invention also provides a method of bonding a mirror structure of the kind comprising a transparent facing lamina backed by a layer of reflecting material to a substantially rigid support surface by means of an adhesive composition which includes a volatile liquid component and with a flexible and resiliently compressible layer of a polymeric foam interposed between said mirror stucture and said support surface, characterised in that there is interposed between the foam layer and the support surface a flexible and substantially impermeable polyurethane skin which is heat bonded to the foam layer.

The polyurethane skin does not appear to be attacked by contact adhesives of the kind commonly employed to bond rigid structures together and moreover bonds well to these adhesives. By heat-bonding it to the foam layer, the use is avoided of another adhesive the components of which might attack the foam layer and/or its bond with the reflecting layer of the mirror. The heat bonding may be effected in any convenient manner, e.g. by radio frequency heating or by a heat source.

It may be found desirable for at least one face of the foam layer to be provided with a web which is bonded to the foam and which will prevent or inhibit the foam layer from stretching or otherwise deforming during its bonding to the other components employed in the production of the mirror structure of the invention. The web, hereinafter referred to as a stabilising web, may be of any suitable material, e.g. flexible thermoplastics film or a textile e.g. of knitted or woven polyamide (nylon) or polyester.

The foam layer will normally be bonded to the reflecting layer-backed lamina by a suitable adhesive. Preferably, however, there is provided between the foam layer and the adhesive a flexible moisture-impermeable microporous membrane which will permit the escape of volatiles from said adhesive while preventing, when the mirror structure is in use, any water or moisture which enters the foam layer from contacting the adhesive layer.

The microporous membrane may comprise any film which is impermeable to moisture and water but is permeable to gas or vapour; however it is preferably plastics. If a thermoplastic membrane is used which can be bonded to the foam layer by heat, the need for another adhesive-applying step is avoided. The microporous membrane need only be a few microns, e.g. 10 to 15 microns, in thickness.

The said microporous membrane may also act as the above-mentioned stabilising web if it is attached to the foam layer before the latter is bonded to the reflecting layer and is of a suitable material. However, the web and membrane may be different, if desired.

Examples of materials suitable for the foam layer include the foams marketed by Dunlop Ltd of England as DF 113, DF 119 and, in particular, D8.

An example of an adhesive for bonding the facing lamina to the foam layer is SN 1501 marketed by Dunlop Ltd.

A suitable thickness for the foam layer is 0.1 to 0.15 inch (about 2 to 4 mm) although larger or smaller thicknesses may be used.

The facing lamina may be of glass or plastics. When it is plastics, it may be a sheet e.g. of acrylic or a film e.g. of polyester. The facing lamina may be tinted. The reflecting layer is generally metal, e.g. silver or copper.

Any polyurethane film can be used, provided it is flexible and can be heat-bonded to the foam layer, either by heating the foam or by heating the film. The thickness of the film is not critical, but there is no advantage in using a film having a thickness greater than 2 or 3 mm. With respect to the composition of the polyurethane, a linear polyester-urethane of 30 micron thickness, sold under the tradename "TUFTANE" has been found to be satisfactory, but polyether-urethanes can also be used, as can cross-linked film.

BRIEF DESCRIPTION OF THE DRAWINGS

The mirror according to the invention is illustrated in the accompanying drawings in which.

DETAILED DESCRIPTION OF THE INVENTION

Figure 1:
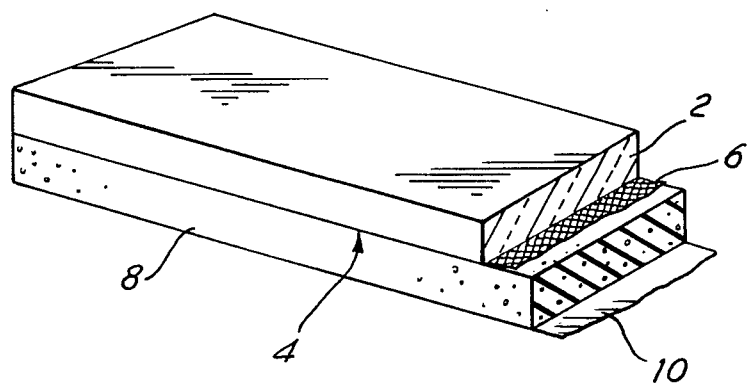
FIG. 1 is a perspective view of a first embodiment, partly cut away to show more clearly the various component layers of the product.

In the embodiment illustrated in FIG. 1, the mirror comprises a 3 mm thick transparent acrylic or glass sheet 2 provided in conventional manner, e.g. by silvering and coppering, with a layer 4 of reflecting material. This is bonded by means of Dunlop adhesive SN 1501 (not shown) to a 3 mm thick layer 8 of flexible and resiliently compressible foam, such as Dunlop DF 113, DF 119 or D8, to which a stabilising web 6 comprising a nylon scrim has previously been bonded and which lies between the foam layer and the reflecting layer. A flexible and substantially impermeable film 10 of polyester-urethane 30 microns thick ("TUFTANE") is heat bonded to the underside of the foam layer 8.

The mirror was manufactured in the following manner. The polyurethane film 10 was laminated to one face of the plastics foam sheet 8 by placing the film in contact with the foam layer and then heating to cause the polyurethane to soften and adhere to the foam. In similar manner, the nylon scrim 6 was heat bonded to the other face of the foam layer and the product thereafter glued to the silvered acrylic sheet 2 with the scrim lying between the sheet 2 and the foam layer 8.

The mirror was attached to a wall using a conventional contact adhesive, e.g. EVOSTIK 528, which produced a strong bond between the polyurethane skin and the wall. Because of the impermeable nature of the polyurethane skin the solvent of the adhesive did not permeate through to the mirror/foam interface and consequently there was no danger of the bond between the mirror and the foam being weakened.

Figure 2:
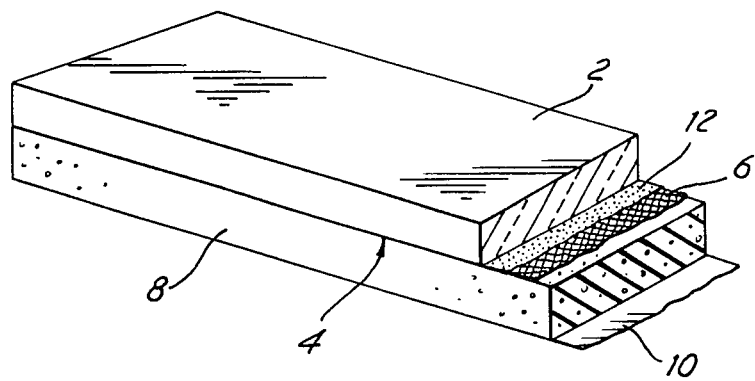
FIG. 2 is a corresponding view of a second embodiment of the product illustrated in FIG. 1.

FIG. 2 illustrates a modification of the mirror product shown in FIG. 1 wherein a sheet 12 of "platinon", a flexible moisture-impermeable microporous plastics film sold by Cole Plastics of England, is bonded between the acrylic sheet and the nylon scrim-coated face of the foam during the manufacture of the laminate.

I claim:

1. In a mirror structure comprising a transparent facing lamina backed by a layer of reflecting material and wherein said layer of reflecting material is bonded to a flexible and resiliently compressible layer of polymeric foam, the improvement wherein a flexible and substantially impermeable polyurethane skin is heat bonded to the face of the foam layer opposite that to which said layer of reflecting material is bonded.

2. A mirror structure as claimed in claim 1 characterised in that one face of the foam layer is provided with a stabilising web which is bonded to the foam layer.

3. A mirror structure as claimed in claim 1 characterised in that there is provided between the foam layer and the layer of adheive which bonds said form layer to said layer of reflecting material, a flexible moisture-impermeable microporous membrane.

4. A mirror structure as claimed in claim 3 in which said membrane is thermoplastic and is bonded to the foam layer by heat.

5. A mirror structure as claimed in claim 2 characterised in that there is provided between the foam layer and the layer of adhesive which bonds said foam layer to said layer of reflecting material, a flexible moisture-impermeable microporous membrane.

6. A mirror structure as claimed in claim 5 in which said membrane is thermoplastic and is bonded to the foam layer by heat.

7. A method of bonding a mirror structure, including a transparent facing lamina backed by a layer of reflecting material, to a substantially rigid support surface by means of an adhesive composition which includes a volatile liquid component, said method comprising the steps of interposing a flexible and resiliently compressible layer of a polymeric foam between said layer of reflecting material and said support surface, interposing between the foam layer and the support surface a flexible and substantially impermeable polyurethane skin, heat bonding said skin to the foam layer, and boding the skin to the support surface by means of the adhesive composition.

* * * * *